US012576647B2

(12) United States Patent
Saito et al.

(10) Patent No.: US 12,576,647 B2
(45) Date of Patent: Mar. 17, 2026

(54) CARTRIDGE

(71) Applicant: Roland DG Corporation, Hamamatsu (JP)

(72) Inventors: Risa Saito, Hamamatsu (JP); Akihiro Suzuki, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 166 days.

(21) Appl. No.: 18/738,365

(22) Filed: Jun. 10, 2024

(65) Prior Publication Data

US 2025/0375966 A1 Dec. 11, 2025

(30) Foreign Application Priority Data

Jul. 11, 2023 (JP) ................................. 2023-114014

(51) Int. Cl.
*B41J 2/175* (2006.01)
*B41J 2/17* (2006.01)

(52) U.S. Cl.
CPC ......... *B41J 2/17513* (2013.01); *B41J 2/1721* (2013.01); *B41J 2/17553* (2013.01)

(58) Field of Classification Search
CPC .. B41J 2/17513; B41J 2/1721; B41J 2/17553; B41J 2/17503
See application file for complete search history.

(56) References Cited

U.S. PATENT DOCUMENTS

2019/0210376 A1* 7/2019 Shimizu .................. B41J 2/165

FOREIGN PATENT DOCUMENTS

JP 2021-123108 A 8/2021

* cited by examiner

*Primary Examiner* — Thinh H Nguyen
(74) *Attorney, Agent, or Firm* — Keating & Bennet, LLP

(57) ABSTRACT

A cartridge includes an absorber capable of absorbing waste ink, an enclosure that encloses the absorber, and a casing that stores the absorber enclosed in the enclosure.

4 Claims, 5 Drawing Sheets

CARTRIDGE

CROSS REFERENCE TO RELATED APPLICATIONS

This application claims the benefit of priority to Japanese Patent Application No. 2023-114014 filed on Jul. 11, 2024. The entire contents of this application are hereby incorporated herein by reference.

BACKGROUND OF THE INVENTION

1. Field of the Invention

The present invention relates to cartridges that accumulate waste ink inside.

2. Description of the Related Art

As an example of a printer, there is an inkjet printer that discharges ink onto a medium such as printing paper to print characters, figures, images, or the like. The inkjet printer has a function of suctioning ink or bubbles from an inkjet nozzle and storing the suctioned ink as waste ink.

Japanese Unexamined Patent Publication No. 2021-123108 discloses a cartridge including an absorber capable of absorbing waste ink, and a casing that stores the absorber. The absorber is attachable and detachable from the casing. The absorber in which the waste ink is absorbed can be replaced with a new absorber.

SUMMARY OF THE INVENTION

The absorber in which the waste ink is absorbed is likely to come into close contact with the casing. It takes time to replace the absorber.

Example embodiments of the present invention provide cartridges in each of which an absorber capable of absorbing waste ink can be easily replaced.

According to an example embodiment of the present disclosure, there is provided a cartridge including an absorber capable of absorbing waste ink, an enclosure that encloses the absorber, and a casing that stores the absorber enclosed in the enclosure.

According to example embodiments of the present disclosure, it is possible to provide cartridges in which the absorber capable of absorbing the waste ink can be easily replaced.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
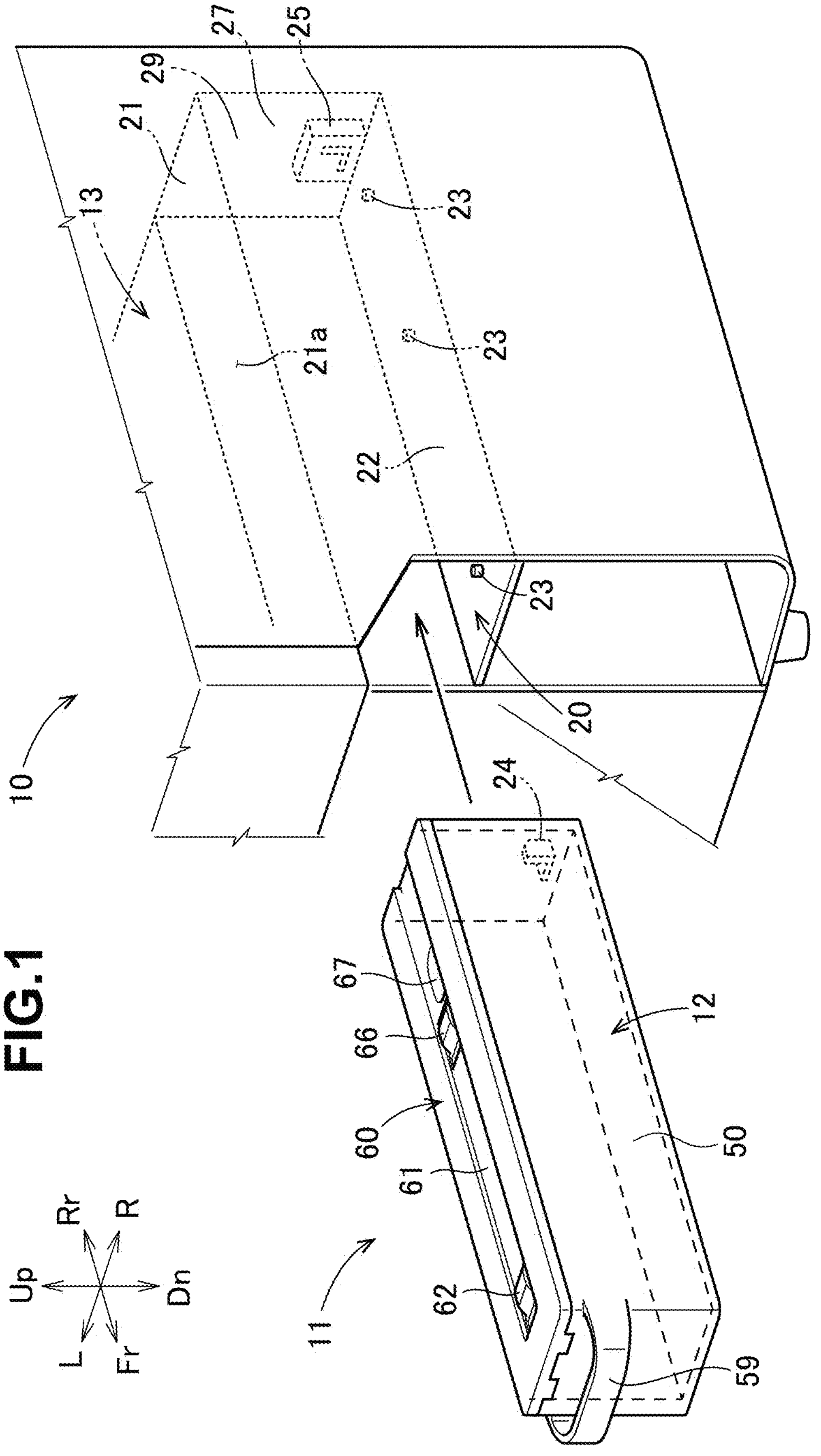
FIG. 1 is a perspective view of a printer including a cartridge according to an example embodiment of the present invention and a storage portion that stores the cartridge.

Example embodiments will be described based on the accompanying drawings. In the drawings, Fr, Rr, Le, Ri, Up, and Dn represent the front, the rear, the left, the right, the top or up, and the bottom or down, respectively.

Referring to FIG. 1, an inkjet printer 10 (hereinafter, referred to as the printer 10) according to the present example embodiment discharges ink onto a medium such as printing paper to print characters, figures, images, or the like. The printer 10 has a function of suctioning ink or bubbles from an inkjet nozzle (not shown) and storing the suctioned ink as waste ink. A width direction of the inkjet printer is referred to as a left-right direction, and a height direction of the inkjet printer is referred to as an up-down direction.

The printer 10 includes a cartridge 11 capable of accumulating the waste ink inside, and a storage portion 20 provided at a right end portion of the printer 10 and capable of storing the cartridge 11. The position where the storage portion 20 is provided is not limited to a front portion of the printer.

Figure 2:
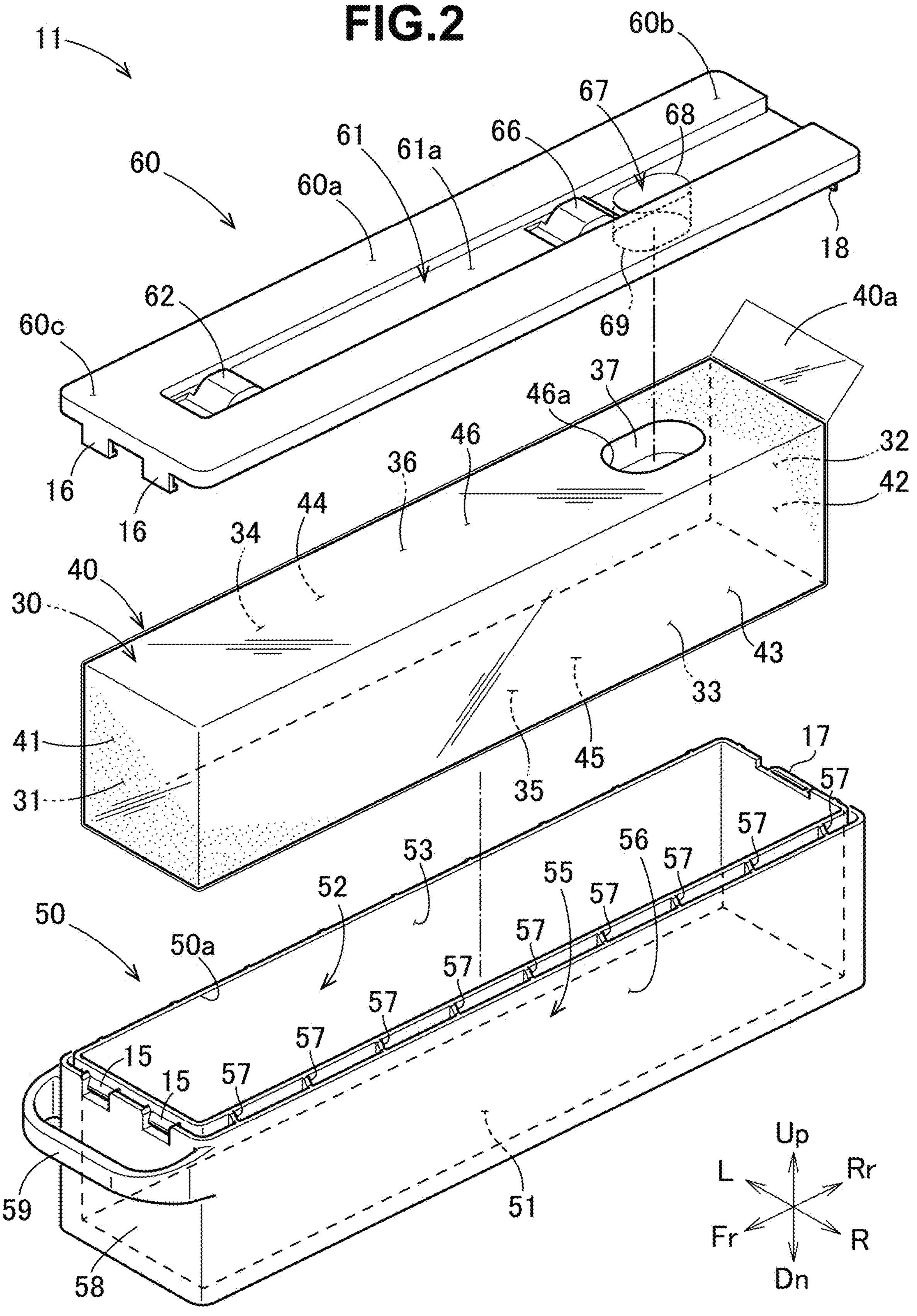
FIG. 2 is an exploded perspective view of the cartridge shown in FIG. 1.

Referring to FIG. 1 and FIG. 2, the direction in which the cartridge 11 is inserted into the storage portion 20 is referred to as the rear (back side), and the direction in which the cartridge 11 is taken out from the storage portion 20 is referred to as the front (front side). The cartridge 11 has a block shape, and a longitudinal direction of the cartridge 11 is referred to as a front-rear direction. The cartridge 11 includes an absorber 30 capable of absorbing the waste ink, an enclosure 40 that encloses the absorber 30, and a casing 12 that stores the absorber 30 enclosed in the enclosure 40.

The absorber 30 has a rectangular parallelepiped shape, and includes a front surface 31, a rear surface 32, a right surface 33, a left surface 34, a lower surface 35, and an upper surface 36. The material of the absorber 30 is, for example, a sponge, and a well-known member can be adopted as appropriate.

The enclosure 40 is made of a transparent synthetic resin such as polyethylene, and is formed in a film shape that is in close contact with each of the surfaces 31 to 36 of the absorber 30. The enclosure 40 includes a front cover portion 41 that covers the front surface 31, a rear cover portion 42 that covers the rear surface 32, a right cover portion 43 that covers the right surface 33, a left cover portion 44 that covers the left surface 34, a lower cover portion 45 that covers the lower surface 35, and an upper cover portion 46 that covers the upper surface 36. An exposure hole 46*a* is formed in the upper cover portion 46 to allow a portion of the upper surface 36 of the absorber 30 to be exposed.

The casing 12 is made of synthetic resin, and includes a box 50 having a rectangular parallelepiped shape, including an opening 50*a* that is open upward, and capable of storing the absorber 30 enclosed in the enclosure 40, and a lid 60 capable of closing the opening 50*a* of the box 50.

Figure 3:
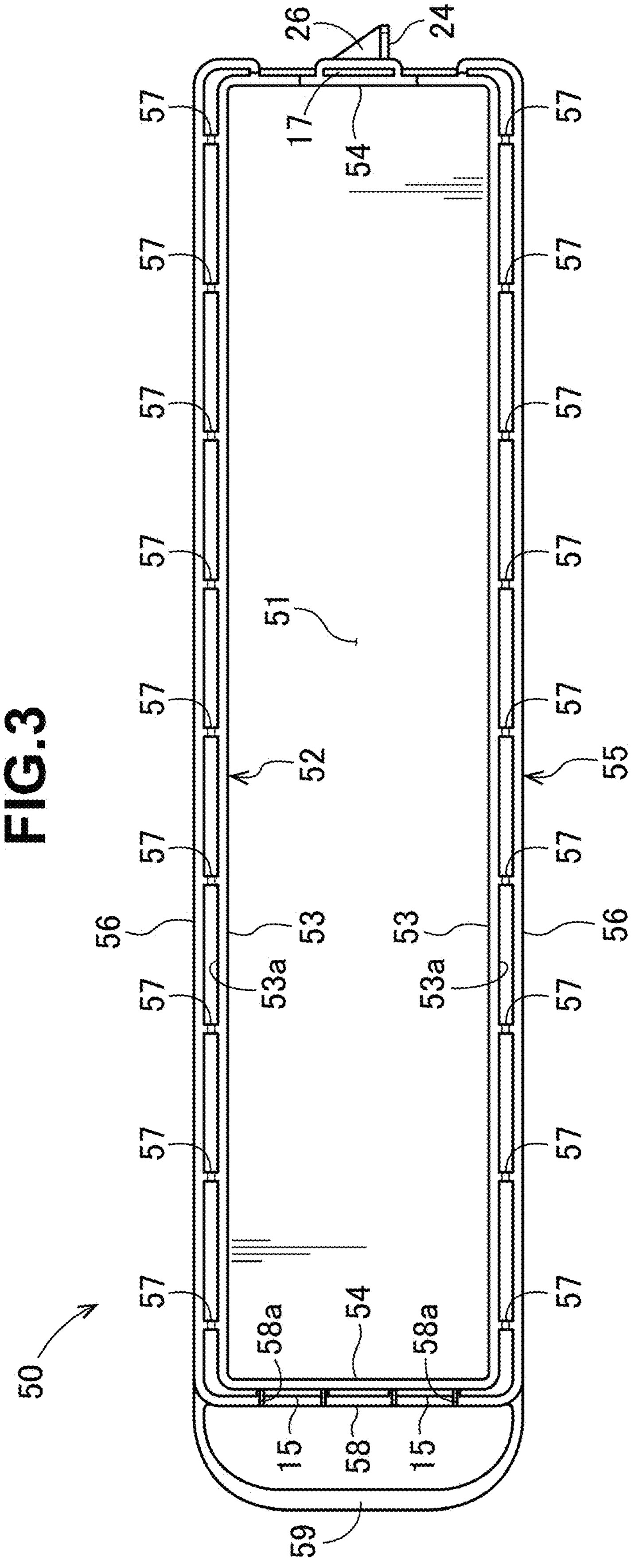
FIG. 3 is a plan view of the cartridge shown in FIG. 2.

Referring to FIG. 2 and FIG. 3, a longitudinal direction of the box 50 is the front-rear direction. The box 50 includes a bottom portion 51 capable of supporting the lower surface 35 of the absorber 30 enclosed in the enclosure 40, an inner wall portion 52 extending upward from a peripheral edge of the bottom portion 51 and capable of surrounding the absorber 30 enclosed in the enclosure 40, and a longitudinal outer wall portion 55 provided along an outer side of the inner wall portion 52.

The inner wall portion 52 includes two longitudinal inner wall portions 53 and 53 extending in a longitudinal direction of the casing 12, and two lateral inner wall portions 54 and 54 that connect the longitudinal inner wall portions 53 and 53.

Further, the box 50 includes two longitudinal outer wall portions 55 and 55 provided with gaps with respect to outer surfaces 53*a* of the longitudinal inner wall portions 53, a plurality (may be single) of ribs 57 that connect the longitudinal inner wall portions 53 and the longitudinal outer wall portions 55, and a lateral outer wall portion 58 provided with a gap with respect to an outer surface of the lateral inner wall portion 54 on the front side.

The lateral outer wall portion 58 and the longitudinal outer wall portions 55 and 55 are continuous with each other, and define the longitudinal outer wall portion 55. A cartridge grip portion 59 that a user can grip when replacing the cartridge 11 is provided on the lateral outer wall portion 58 on the front side.

An upper surface 60*a* of the lid 60 of the cartridge 11 includes a groove 61 extending in the front-rear direction. The groove 61 extends from a rear end portion 60*b* of the upper surface to the front of a front end portion 60*c*. The entirety of the upper surface 60*a* of the lid 60 may be flat instead of being provided with the groove 61.

The groove 61 includes a first protrusion 62 (protrusion) protruding upward, a second protrusion 66 located behind the first protrusion 62 and protruding upward, and an introduction port 67 which is located behind the second protrusion 66 and through which the waste ink is introducible into the inside of the cartridge 11.

With respect to the front-rear direction, the first protrusion 62 is located in front of the center, and the second protrusion 66 and the introduction port 67 are located behind the center.

Figure 4:
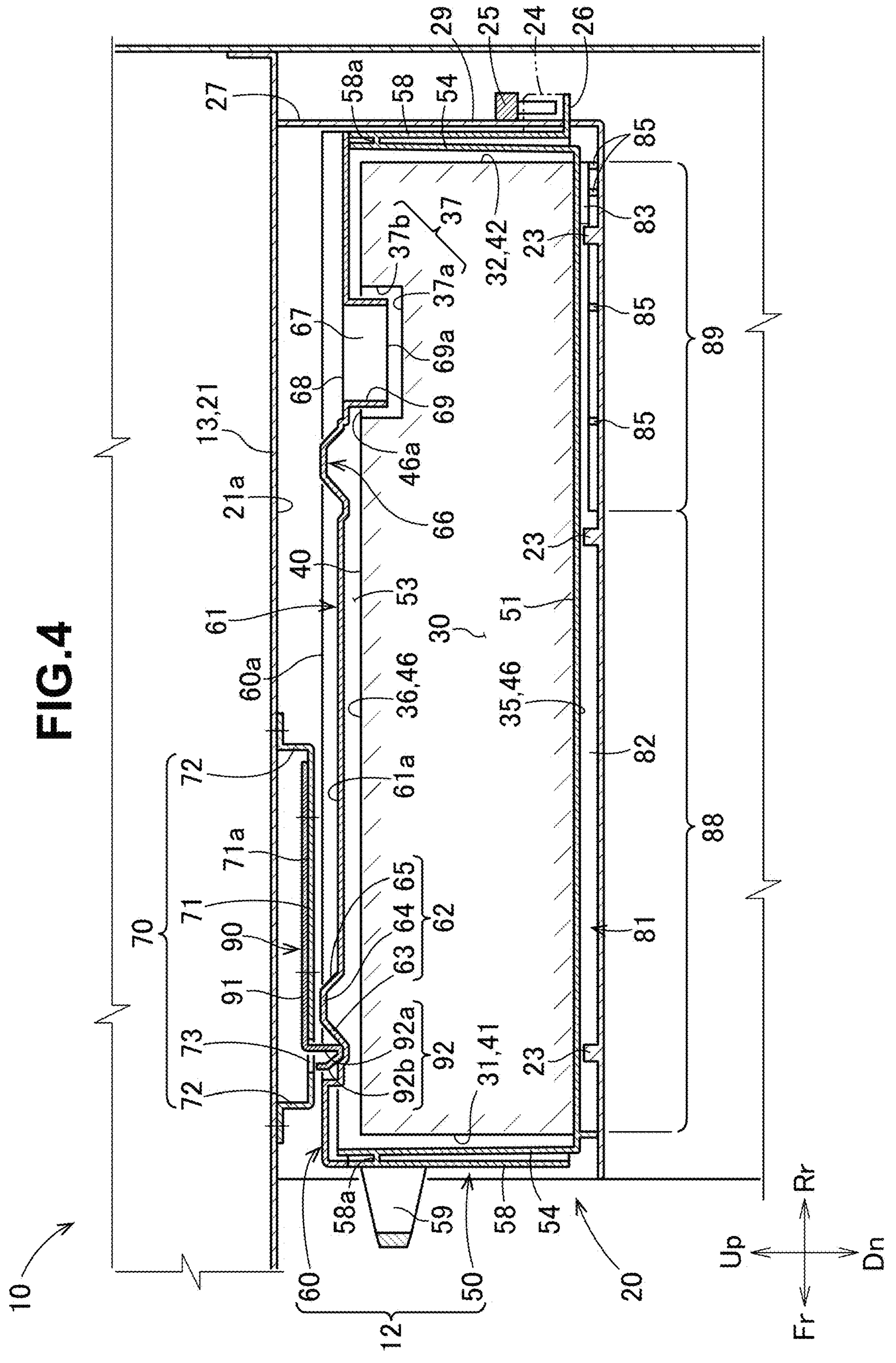
FIG. 4 is a cross-sectional view of the cartridge shown in the storage portion.

Referring to FIG. 4, the first protrusion 62 has a substantially trapezoidal shape in a cross section of the cartridge 11 when viewed along the width direction (left-right direction) of the printer 10. In detail, the first protrusion 62 includes a front inclined portion 63 inclined away from a bottom surface of the groove 61 as the front inclined portion 63 extends toward the rear side, a top portion 64 extending from an upper end of the front inclined portion 63 toward the rear side along a bottom surface 61*a* of the groove 61, and a rear inclined portion 65 extending obliquely from an end portion on the rear side of the top portion 64 toward the bottom surface 61*a* of the groove 61.

With respect to the up-down direction, the top portion 64 and the upper surface 60*a* of the lid 60 are at the same or substantially the same height. Namely, the top portion 64 is located on substantially the same plane as the upper surface 60*a* of the lid 60. The top portion 64 may be located above or below the upper surface 60*a* of the lid 60.

The second protrusion 66 has a substantially trapezoidal shape, and a configuration of the second protrusion 66 is the same as that of the first protrusion 62. The description will be omitted.

The introduction port 67 includes a peripheral edge 68 serving as an inlet for the waste ink, and a tubular portion 69 extending from the peripheral edge 68 towards a box 50 side (lower side). The shape of the peripheral edge 68 is an athletic track shape, but may be a perfect circular shape, an elliptical shape, a polygonal shape, or the like. The tubular portion 69 penetrates through the exposure hole 46*a* of the upper cover portion 46 of the enclosure 40. A tip 69*a* of the tubular portion 69 is located inside the enclosure 40.

Referring to FIG. 2 and FIG. 4, the upper surface 36 of the absorber 30 includes an exposed portion 37 that is exposed from the exposure hole 46*a* located in the enclosure 40, and that serves as an inlet for the waste ink. The exposed portion 37 is recessed to fit to the tubular portion 69 of the introduction port 67. The exposed portion 37 is located behind the center in the front-rear direction. Both a bottom surface 37*a* of the exposed portion 37 and an inner peripheral surface 37*b* of the exposed portion 37 are separated from the tubular portion 69, but may be in contact with the tubular portion 69.

The lid 60 includes two front locking portions 16 and 16 at a front end portion thereof and a rear locking portion 18 at a rear end portion thereof. The box 50 includes front locked portions 15 and 15 that can be locked to the two front locking portions 16 and 16, and a rear locked portion 17 that can be locked to the rear locking portion 18.

Referring to FIG. 1 and FIG. 4, the storage portion 20 includes a ceiling portion 21 capable of facing the lid 60, and a bottom surface 22 capable of supporting the bottom portion 51 of the box 50. The ceiling portion 21 is an end portion on the right side of a plate 13 made of metal and provided across the entirety of the printer 10 in the width direction. A plurality (may be single) of projections 23 aligned in the front-rear direction are provided on the bottom surface 22.

A proximity sensor 25 that detects the presence or absence of the cartridge 11 is provided on a back surface of a back wall 29 of the storage portion 20. A lateral inner wall portion 54 on the rear side of the box 50 includes a detected portion 24 having a plate shape that protrudes rearward and that can be detected by the proximity sensor 25, and a reinforcing portion 26 having a plate shape that is orthogonal to the detected portion 24 and that reinforces the detected portion.

A fixing member 70 configured by bending a metal plate is fixed to a lower surface 21*a* of the ceiling portion 21. The fixing method is a well-known method such as fastening with screws or caulking. The fixing member 70 has, for example, a substantially U-shaped cross section, and includes a main body portion 71 along the ceiling portion 21, and upright wall portions 72 and 72 extending from both ends of the main body portion 71 to the ceiling portion 21.

Although not shown, the fixing member 70 is provided across the entirety of the printer 10 in the width direction similarly to the plate 13 (refer to FIG. 1), and increases the rigidity of the entirety of the plate 13. A width of the fixing member 70 may be set to match a width of the ceiling portion 21, and the fixing member 70 may be fixed only to the ceiling portion 21.

Figure 5B:
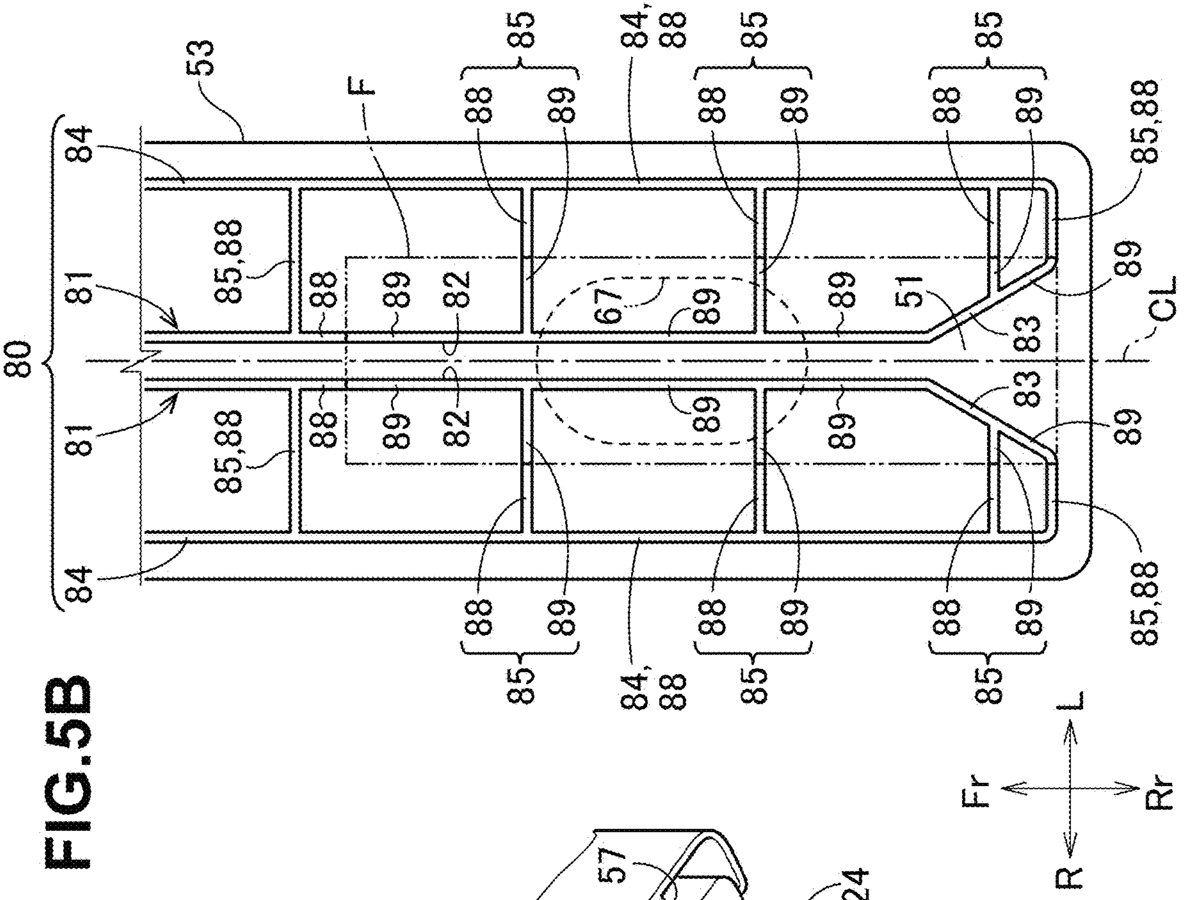
FIG. 5B is a plan view of a bottom portion of the box of the cartridge.
Figure 5A:
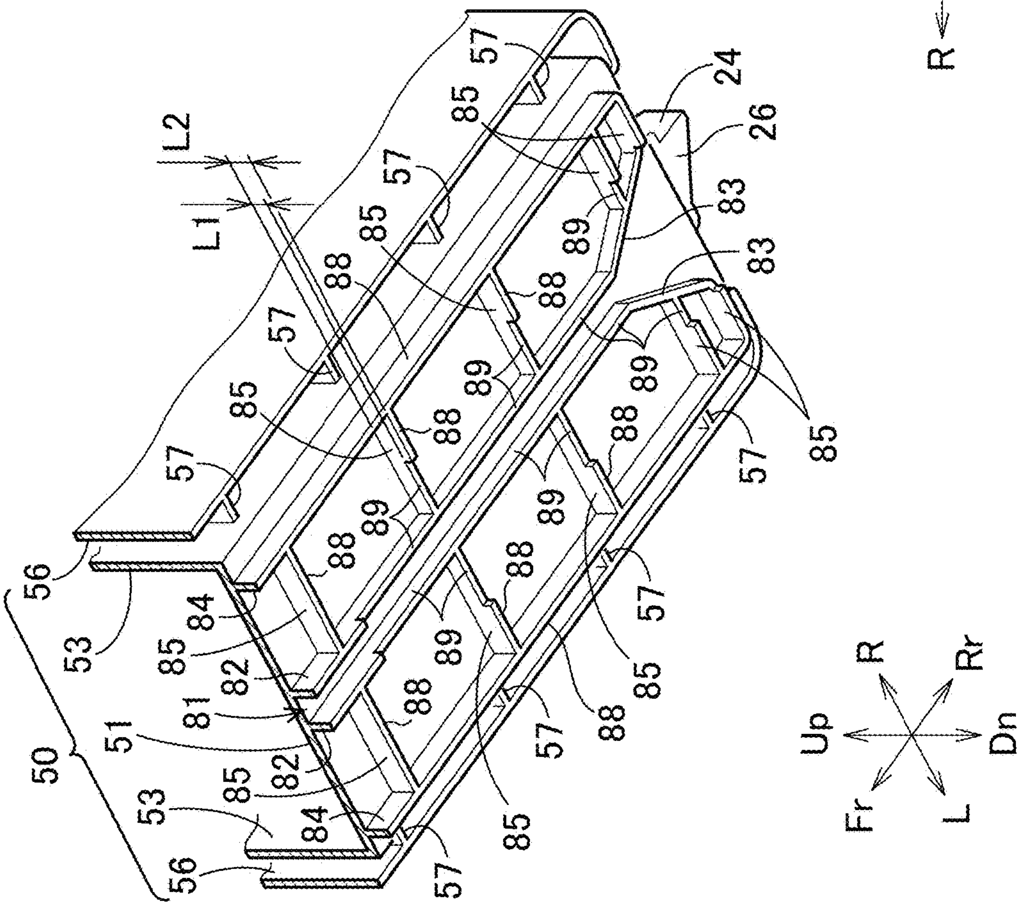
FIG. 5A is a perspective view of a box of the cartridge when viewed obliquely from below.

Referring to FIGS. 5A and 5B, the bottom portion 51 of the box 50 includes leg portion 80 extending downward from the bottom portion 51. A configuration of the leg portion 80 when viewed in a direction facing the bottom portion 51 (refer to FIG. 5B) will be described. A line passing through the center in the width direction and extending in the longitudinal direction is referred to as a center line CL. The leg portion 80 is symmetrical about the center line CL in the width direction. Hereinafter, a configuration on one side of the center line CL will be described.

The leg portion 80 includes a guide portion 81 that can come into contact with the projections 23 (refer to FIG. 1) of the storage portion 20 to guide the cartridge 11 when the cartridge 11 is stored. The guide portion 81 includes a guide straight portion 82 extending along the center line CL, and a guide inclined portion 83 that moves away from the center line CL as the guide inclined portion 83 extends rearward from a rear end of the guide straight portion 82.

Further, the leg portion 80 includes an outer leg portion 84 located outside the guide portion 81 and extending in the same direction as the guide straight portion 82, and a plurality of connecting portions 85 extending in the width direction and connecting the guide portion 81 and the outer leg portion 84. The above-described configuration of the leg portion 80 is one example, and the configuration of the leg portion when viewed in a direction facing the lower surface can be changed.

Referring to FIG. 4 and FIG. 5A, the leg portion 80 includes short leg portions 89 and long leg portions 88 having different lengths with respect to the height direction of the cartridge 11. A length L1 of the short leg portions 89 is shorter than a length L2 of the long leg portions 88 (L1<L2). Referring to FIG. 4, when the cartridge 11 is stored, the long leg portions 88 are in contact with the bottom portion 51 of the storage portion 20, and the short leg portions 89 are separated from the bottom portion 51.

Referring to FIG. 5B, the short leg portions 89 are located below the introduction port 67. The short leg portions 89 are set inside the introduction port 67 and at an outer peripheral portion of the introduction port 67. The introduction port 67 has an athletic track shape. A longitudinal direction of the introduction port 67 is the front-rear direction. A longitudinal direction of a range (refer to frame line F) set as the short leg portions 89 in the leg portion 80 is also the front-rear direction. The range set as the short leg portions 89 can be changed as appropriate.

Referring to FIG. 4, the storage portion 20 is provided with an elastic member 90 that is elastically deformable. The elastic member 90 comes into contact with the first protrusion 62 and the second protrusion 66 when the cartridge 11 is pulled out from the storage portion 20 and when the cartridge 11 is attached to the storage portion 20.

The elastic member 90 is, for example, a leaf spring, and includes a supported portion 91 superimposed and supported on an upper surface 71*a* of the main body portion 71, and a displacement portion 92 that is provided at a front end portion of the supported portion 91, and that deforms when the displacement portion 92 comes into contact with the first protrusion 62 and the second protrusion 66 to be changed in position in the up-down direction.

The displacement portion 92 includes a first portion 92*a* extending from the front end portion of the supported portion 91 to the groove 61 of the lid 60, and penetrating through a hole 73 in the main body portion 71, and a second portion 92*b* extending obliquely upward and forward from a lower end of the first portion 92*a*. When the cartridge 11 is stored, the lower end of the first portion 92*a* is located in front of the front inclined portion 63, and is in contact with a bottom surface 61*a* of the groove 61. A portion of the bottom surface 61*a*, with which the lower end of the first portion 92*a* is in contact, is slightly recessed.

The elastic member 90 is fixed to the fixing member 70, but may be directly fixed to the ceiling portion 21 without providing the fixing member 70. The fixing method is a well-known method such as fastening with screws or caulking. The shape, position, or fixing method of the elastic member 90 is not limited to the present example embodiment.

The cartridge 11 includes the absorber 30 capable of absorbing the waste ink, the enclosure 40 that encloses the absorber 30, and the casing 12 that stores the absorber 30 enclosed in the enclosure 40. The enclosure 40 is interposed between the absorber 30 in which the waste ink is absorbed and the box 50 of the casing 12. The absorber 30 and the box 50 are not in direct contact with each other. The absorber 30 can be easily replaced. The configuration of the enclosure 40 does not matter as long as the absorber 30 is prevented from coming into direct contact with the box 50. For example, the enclosure 40 may be a bag with an open top.

In addition, the enclosure 40 includes a grip portion 40*a* that a user can grip when replacing the absorber 30. The absorber 30 of the enclosure 40 can be more easily replaced.

Referring to FIG. 3, the casing 12 includes the inner wall portion 52 made of resin and capable of surrounding the absorber 30 enclosed in the enclosure 40. The inner wall portion 52 includes the two longitudinal inner wall portions 53 and 53 extending in the longitudinal direction of the casing 12. For this reason, warpage is likely to occur in the longitudinal inner wall portions 53. However, the longitudinal outer wall portions 55 are provided with gaps with respect to the outer surfaces 53*a* of the longitudinal inner wall portions 53. Further, the plurality of ribs 57 are provided between the longitudinal inner wall portion 53 and the longitudinal outer wall portion 55. The warpage of the longitudinal inner wall portions 53 can be reduced or prevented.

Referring to FIG. 4, the casing 12 includes the introduction port 67 through which the waste ink is introducible into the inside of the casing 12. The tubular portion 69 extends from the peripheral edge 68 of the introduction port 67 toward the inside of the casing 12. The tip 69*a* of the tubular portion 69 is located inside the enclosure 40. For this reason, the waste ink can be prevented from adhering to the enclosure 40.

The absorber 30 includes the exposed portion 37 exposed from the exposure hole 46*a* of the enclosure 40. The exposed portion 37 is recessed such that the tubular portion 69 is fitted thereinto. In a case where the absorber 30 is stored in a state where the front and rear directions are reversed with respect to the box 50, when an attempt is made to close the lid 60, the tubular portion 69 of the lid 60 comes into contact with the upper surface 36 of the absorber 30, and the lid 60 cannot be closed. The absorber 30 can be prevented from being stored in a wrong orientation with respect to the box 50.

Referring to FIG. 1, the printer 10 includes the cartridge 11 capable of accumulating the waste ink inside, and the storage portion 20 capable of storing the cartridge 11. Referring to FIG. 2, the upper surface 60*a* of the cartridge 11 includes the first protrusion 62 protruding upward. The storage portion 20 is provided with the elastic member 90 (leaf spring) that comes into contact with the first protrusion 62 to be elastically deformable.

The elastic member 90 is separate from the storage portion 20. The hardness of the elastic member 90 when the cartridge 11 is stored in the storage portion 20 and when the cartridge 11 is pulled out from the storage portion 20 can be easily set. It is possible to provide the printer 10 in which the cartridge 11 can be smoothly stored and taken out.

In addition, the elastic member 90 is located on the ceiling portion 21 via the fixing member 70. A user that uses the printer 10 finds it difficult to visually recognize the elastic member 90, so that the appearance is good.

The upper surface 60*a* of the cartridge 11 includes the introduction port 67 through which the waste ink is introducible into the inside of the cartridge 11, and the second protrusion 66 in front of the introduction port 67. In other words, the second protrusion 66 is located in front of the introduction port 67. Even if the waste ink scatters forward, the second protrusion 66 serves as a wall capable of blocking the scattering of the waste ink.

Referring to FIGS. 5A and 5B, the bottom portion 51 of the cartridge 11 includes the leg portion 80 extending downward from the bottom portion 51. The leg portion 80 includes long leg portions 88 and short leg portions 89 having different lengths with respect to the up-down direction. The short leg portions 89 are located below the introduction port 67.

Referring to FIG. 4, the waste ink is likely to adhere to a portion of the bottom portion 51 of the cartridge 11, the portion being located below the introduction port 67. The short leg portions 89 are located around the portion. The short leg portions 89 are not in contact with the bottom surface 22 of the storage portion 20. The waste ink is less likely to adhere to the short leg portions 89.

The present invention is not limited to the example embodiments as long as actions and effects of the present invention are achieved.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cartridge comprising:

an absorber capable of absorbing waste ink;

an enclosure that encloses the absorber; and a casing that stores the absorber enclosed in the enclosure.

2. The cartridge according to claim 1, wherein the casing includes an inner wall portion made of resin and capable of surrounding the absorber enclosed in the enclosure;

the inner wall portion includes longitudinal inner wall portions extending in a longitudinal direction of the casing; longitudinal outer wall portions are provided with gaps with respect to outer surfaces of the longitudinal inner wall portions; and at least one rib is provided between each of the longitudinal inner wall portions and each of the longitudinal outer wall portions.

3. The cartridge according to claim 1, wherein the casing includes a box including an opening and capable of storing the absorber, and a lid capable of closing the opening of the box;

the lid includes an introduction port through which the waste ink is introducible into an inside of the casing;

a tubular portion extends from a peripheral edge of the introduction port toward the inside of the casing; and a tip of the tubular portion is located inside the enclosure.

4. The cartridge according to claim 3, wherein the absorber includes an exposed portion exposed from the enclosure; and the exposed portion is recessed such that the tubular portion of the lid is fitted into the exposed portion.

* * * * *